(12) United States Patent
Hoshino et al.

(10) Patent No.: US 10,814,311 B2
(45) Date of Patent: Oct. 27, 2020

(54) EXHAUST GAS PURIFYING CATALYST

(71) Applicant: CATALER CORPORATION, Kakegawa-shi, Shizuoka (JP)

(72) Inventors: Sho Hoshino, Kakegawa (JP); Yuki Takesue, Kakegawa (JP); Ryota Onoe, Kakegawa (JP); Taku Miura, Kakegawa (JP); Takaya Ota, Kakegawa (JP)

(73) Assignee: CATALER CORPORATION, Kakegawa (JP)

( * ) Notice: Subject to any disclaimer, the term of this patent is extended or adjusted under 35 U.S.C. 154(b) by 0 days.

(21) Appl. No.: 16/329,630

(22) PCT Filed: Sep. 19, 2017

(86) PCT No.: PCT/JP2017/033658
§ 371 (c)(1),
(2) Date: Feb. 28, 2019

(87) PCT Pub. No.: WO2018/056246
PCT Pub. Date: Mar. 29, 2018

(65) Prior Publication Data
US 2019/0193057 A1 Jun. 27, 2019

(30) Foreign Application Priority Data
Sep. 26, 2016 (JP) .................................. 2016-187295

(51) Int. Cl.
*B01J 23/10* (2006.01)
*B01J 23/44* (2006.01)
(Continued)

(52) U.S. Cl.
CPC ............ *B01J 23/63* (2013.01); *B01D 53/945* (2013.01); *B01D 53/9472* (2013.01);
(Continued)

(58) Field of Classification Search
CPC . B01J 23/10; B01J 23/44; B01J 23/464; B01J 23/63; B01J 35/0006; B01J 35/04;
(Continued)

(56) References Cited

U.S. PATENT DOCUMENTS 7,107,763 B2 * 9/2006 Suwabe ............. B01D 46/2455
422/177
7,871,452 B2 * 1/2011 Yamada ............... B01D 53/944
422/177
(Continued)

FOREIGN PATENT DOCUMENTS

| EP | 2 491 999 A1 | 8/2012 |
| JP | 2008-513189 A | 5/2008 |

(Continued)

OTHER PUBLICATIONS

May 23, 2019 Extended Search Report issued in European Patent Application No. 17853018.4.
(Continued)

*Primary Examiner* — Cam N. Nguyen
(74) *Attorney, Agent, or Firm* — Oliff PLC

(57) ABSTRACT

An exhaust gas purifying catalyst includes a catalyst layer formed inside a partition wall of a base material having a wall flow structure, and has an upstream-side and a downstream-side catalyst layer. The upstream-side catalyst layer includes Rh and a Ce-containing oxide, and the downstream-side catalyst layer includes Pd and a Ce-containing oxide. The mass of the catalyst layer per unit volume of the base material is from 105 g/L to 210 g/L, the mass of the upstream-side catalyst layer per unit volume in an upstream-side portion is from 50 g/L to 100 g/L, the mass of the downstream-side catalyst layer per unit volume in a downstream-side portion is from 100 g/L to 150 g/L, the Ce amount per unit volume of the base material is from 14 g/L
(Continued)

to 35 g/L, and the Ce amount per unit volume in the upstream-side portion is from 5 g/L to 20 g/L.

12 Claims, 3 Drawing Sheets

(51) Int. Cl.

| | | |
|---|---|---|
| *B01J 23/63* | (2006.01) | |
| *B01J 35/00* | (2006.01) | |
| *B01J 35/04* | (2006.01) | |
| *F01N 3/022* | (2006.01) | |
| *F01N 3/035* | (2006.01) | |
| *F01N 3/10* | (2006.01) | |
| *F01N 3/24* | (2006.01) | |
| *F01N 3/28* | (2006.01) | |
| *B01D 53/94* | (2006.01) | |
| *B01J 23/46* | (2006.01) | |
| *B01J 37/02* | (2006.01) | |
| *F01N 3/021* | (2006.01) | |

(52) U.S. Cl.
CPC ............... *B01J 23/10* (2013.01); *B01J 23/44* (2013.01); *B01J 23/464* (2013.01); *B01J 35/0006* (2013.01); *B01J 35/04* (2013.01); *B01J 37/0201* (2013.01); *B01J 37/0228* (2013.01); *B01J 37/0236* (2013.01); *B01J 37/0248* (2013.01); *F01N 3/022* (2013.01); *F01N 3/035* (2013.01); *F01N 3/10* (2013.01); *F01N 3/101* (2013.01); *F01N 3/24* (2013.01); *F01N 3/28* (2013.01); *B01D 2255/1023* (2013.01); *B01D 2255/1025* (2013.01); *B01D 2255/2065* (2013.01); *B01D 2255/407* (2013.01); *B01D 2255/9022* (2013.01); *B01D 2255/9032* (2013.01); *B01D 2255/9155* (2013.01); *F01N 3/021* (2013.01); *F01N 2250/02* (2013.01); *F01N 2370/02* (2013.01); *F01N 2510/068* (2013.01); *F01N 2510/0682* (2013.01); *F01N 2510/0684* (2013.01)

(58) Field of Classification Search
CPC . F01N 3/022; F01N 3/035; F01N 3/10; F01N 3/101; F01N 3/24; F01N 3/28
See application file for complete search history.

(56) References Cited

U.S. PATENT DOCUMENTS

| | | | |
|---|---|---|---|
| 7,927,551 B2 * | 4/2011 | Miyairi | B01D 53/945 264/42 |
| 8,133,841 B2 * | 3/2012 | Noda | B01D 46/2429 422/177 |
| 8,409,519 B2 * | 4/2013 | Watanabe | B01D 53/945 422/180 |
| 10,018,095 B2 * | 7/2018 | Nomura | B01J 23/10 |
| 10,060,312 B2 * | 8/2018 | Suzawa | F01N 3/0821 |
| 10,071,368 B2 * | 9/2018 | Onoe | B01J 37/02 |
| 10,076,725 B2 * | 9/2018 | Onoe | B01J 35/04 |
| 10,086,363 B2 * | 10/2018 | Onoe | F01N 3/035 |
| 10,159,934 B2 * | 12/2018 | Kitamura | B01J 23/63 |
| 10,159,935 B2 * | 12/2018 | Onoe | B01J 35/04 |
| 10,344,655 B2 * | 7/2019 | Onoe | B01D 53/94 |
| 10,357,744 B2 * | 7/2019 | Ohashi | B01J 35/04 |
| 2006/0057046 A1 | 3/2006 | Punke et al. | |
| 2008/0020922 A1 | 1/2008 | Li et al. | |
| 2009/0087365 A1 | 4/2009 | Klingmann et al. | |
| 2011/0212831 A1 * | 9/2011 | Goto | B01D 46/2474 502/100 |
| 2011/0252773 A1 | 10/2011 | Arnold et al. | |
| 2017/0296969 A1 | 10/2017 | Ohashi et al. | |
| 2017/0306823 A1 | 10/2017 | Onoe et al. | |
| 2018/0021726 A1 | 1/2018 | Onoe et al. | |
| 2018/0021767 A1 | 1/2018 | Onoe et al. | |

FOREIGN PATENT DOCUMENTS

| | | |
|---|---|---|
| JP | 2009-082915 A | 4/2009 |
| JP | 2012-172597 A | 9/2012 |
| JP | 2013-092090 A | 5/2013 |
| WO | 2016/056573 A1 | 4/2016 |
| WO | 2016/060048 A1 | 4/2016 |
| WO | 2016/133085 A1 | 8/2016 |
| WO | 2016/133086 A1 | 8/2016 |
| WO | 2016/133087 A1 | 8/2016 |

OTHER PUBLICATIONS

Dec. 19, 2017 International Search Report issued in International Patent Application No. PCT/JP2017/033658.
Dec. 26, 2019 Office Action issued in Indian Patent Application No. 201927007746.
Jun. 8, 2020 Office Action issued in European Patent Application No. 17853018.4.

* cited by examiner

EXHAUST GAS PURIFYING CATALYST

TECHNICAL FIELD

The present invention relates to an exhaust gas purifying catalyst, and more particularly to an exhaust gas purifying catalyst for purifying exhaust gas discharged from an internal combustion engine such as a gasoline engine.

The present international application claims priority based on Japanese Patent Application No. 2016-187295 filed on Sep. 26, 2016, the entire contents of which are hereby incorporated by reference.

BACKGROUND ART

Generally, exhaust gas discharged from an internal combustion engine includes particulate matter (PM) including carbon as a main component, ash composed of incombustible components, and the like, and the exhaust gas is known to cause air pollution. For that reason, regulations on discharge amount of particulate matter are strengthened year by year along with those on components contained in the exhaust gas, such as hydrocarbon (HC), carbon monoxide (CO), nitrogen oxides (NOx) and the like. Accordingly, techniques for collecting and removing these particulate matters from the exhaust gas have been suggested.

For example, a particulate filter for collecting the particulate matter is provided in the exhaust passage of an internal combustion engine. For example, since a gasoline engine discharges a certain amount of particulate matter together with exhaust gas although this amount is less than that in a diesel engine, a gasoline particulate filter (GPF) is sometimes installed in the exhaust passage. A particulate filter is known of a so-called wall flow type structure in which a base material is constituted by a large number of cells made of porous material, and inlets and outlets of a plurality of the larger number of cells are closed alternately (see, for example, Patent Literature 1). In the wall flow type particulate filter, the exhaust gas flowing in from the cell inlet passes through the partitioned porous cell partition walls and is discharged to the cell outlet. While the exhaust gas passes through the porous cell partition walls, the particulate matter is collected in the pores inside the partition walls. In addition, the possibility of supporting a noble metal catalyst on the particulate filter has been studied in order to further improve the exhaust gas purification performance. For example, Patent Literature 1 describes a filter catalyst (exhaust gas purifying catalyst) in which a palladium layer as a noble metal catalyst is disposed inside a partition wall and a rhodium layer is laminated on the outside (surface) of the partition wall.

CITATION LIST

Patent Literature

Patent Literature 1: Japanese Patent Application Publication No. 2009-82915

SUMMARY OF INVENTION

Technical Problem

A dual catalyst system consisting of a start-up catalyst (S/C) and an under-floor catalyst (UF/C) has been used in recent years. In such a dual catalyst system, since the S/C is mounted directly below the engine, the temperature of the catalyst tends to rise compared to the UF/C at the time of use. Therefore, a highly durable exhaust gas purifying catalyst which is unlikely to deteriorate in performance even when the catalyst is exposed to high temperature at the time of use is needed for the S/C. Another problem is that when the temperature of the exhaust gas is still low, such as immediately after the start of the engine, the purification performance is lowered because the catalyst is not sufficiently warmed up. In particular, a large amount of HC which is an unburnt substance of fuel is contained in the exhaust gas having a low temperature. Therefore, there is a need for an exhaust gas purifying catalyst which is excellent in light-off performance, such that HC purification performance is exhibited at a lower temperature, in a low-temperature state immediately after the start of the engine.

The present invention has been accomplished in view of such circumstances, and a main object thereof is to provide an exhaust gas purifying catalyst provided with a filter catalyst of a wall flow structure type, the catalyst being capable of realizing further improvement in purification performance.

Solution to Problem

The exhaust gas purifying catalyst provided by the present invention is disposed in an exhaust passage of an internal combustion engine and purifies exhaust gas discharged from the internal combustion engine. This catalyst includes a base material having a wall flow structure including an inlet cell in which only an end on an exhaust gas inlet side is open, an outlet cell which is adjacent to the inlet cell and in which only an end on an exhaust gas outlet side is open, and a porous partition wall partitioning the inlet cell and the outlet cell, and a catalyst layer provided inside the partition wall. The catalyst layer has an upstream-side catalyst layer disposed in an upstream-side portion in an exhaust gas flow direction including the end on the exhaust gas inlet side of the base material, and a downstream-side catalyst layer disposed in a downstream-side portion in the exhaust gas flow direction including the end on the exhaust gas outlet side of the base material. The upstream-side catalyst layer includes Rh and a Ce-containing oxide. Further, the downstream-side catalyst layer includes Pd and a Ce-containing oxide. The mass (coating amount) of the catalyst layer per unit volume of the entire base material is from 105 g/L to 210 g/L, the mass of the upstream-side catalyst layer per unit volume in the upstream-side portion (that is, the portion coated with the upstream-side catalyst layer) of the base material is from 50 g/L to 100 g/L, the mass of the downstream-side catalyst layer per unit volume in the downstream-side portion (that is, the portion coated with the downstream-side catalyst layer) of the base material is from 100 g/L to 150 g/L, the amount of Ce per unit volume of the entire base material is from 14 g/L to 35 g/L in terms of $CeO_2$, and the amount of Ce per unit volume in the upstream-side portion of the entire base material is from 5 g/L to 20 g/L in terms of $CeO_2$. According to such a configuration, it is possible to provide an optimum exhaust gas purifying catalyst having a high durability of the catalyst and further improved HC light-off performance.

In a preferred embodiment of the exhaust gas purifying catalyst disclosed herein, the upstream-side catalyst layer is formed in a portion corresponding to at least 40% and at most 80% of the length of the base material from the end on the exhaust gas inlet side of the base material toward the exhaust gas outlet side. The downstream-side catalyst layer is formed in a portion corresponding to at least 40% and at most 80% of the length of the base material from the end on the exhaust gas outlet side of the base material toward the exhaust gas inlet side. Within such ranges of the lengths of the upstream-side catalyst layer and the downstream-side catalyst layer, the light-off performance improvement effect can be exerted more favorably.

In a preferred embodiment of the exhaust gas purifying catalyst disclosed herein, the upstream-side catalyst layer has an upstream-side independent layer that does not overlap with the downstream-side catalyst layer in a length direction of the base material. The upstream-side independent layer is formed in a portion corresponding to at least 20% and at most 50% of the length of the base material from the end on the exhaust gas inlet side of the base material toward the exhaust gas outlet side. Such an upstream-side independent layer can contribute effectively to the improvement of the light-off performance.

In a preferred embodiment of the exhaust gas purifying catalyst disclosed herein, the upstream-side catalyst layer is formed in a portion corresponding to at least 20% and at most 80% of a thickness of the partition wall from a surface of the partition wall in contact with the inlet cell to the outlet cell side. The downstream-side catalyst layer is formed in a portion corresponding to at least 40% and at most 100% of the thickness of the partition wall from a surface of the partition wall in contact with the outlet cell to the inlet cell side. Within such ranges of the thicknesses of the upstream-side catalyst layer and the downstream-side catalyst layer, the light-off performance improvement effect can be exerted more favorably.

In a preferred embodiment of the exhaust gas purifying catalyst disclosed herein, in a thickness direction of the partition wall, the upstream-side catalyst layer is unevenly distributed in the partition wall so as to be in contact with the inlet cell and not in contact with the outlet cell. The downstream-side catalyst layer is unevenly distributed in the partition wall so as to be in contact with the outlet cell and not in contact with the inlet cell. By unevenly distributing the upstream-side catalyst layer and the downstream-side catalyst layer in the thickness direction of the partition walls in this way, the improvement of the light-off performance can be realized at a higher level.

In a preferred embodiment of the exhaust gas purifying catalyst disclosed herein, the upstream-side catalyst layer is formed so as not to overlap with the downstream-side catalyst layer in the thickness direction of the partition wall. According to such a configuration, Pd and Rh are separately supported in the thickness direction of the partition wall. Therefore, sintering between the noble metals is suppressed, and the exhaust gas purification performance can be further improved.

In a preferred embodiment of the exhaust gas purifying catalyst disclosed herein, the Ce-containing oxide is a ceria-zirconia composite oxide. Since the ceria-zirconia composite oxide has high oxygen storage/release capacity, such oxide can be advantageously used as the Ce-containing oxide suitable for the object of the present invention.

In a preferred embodiment of the exhaust gas purifying catalyst disclosed herein, the internal combustion engine is a gasoline engine. In gasoline engines, the temperature of exhaust gas is relatively high, and the performance of a catalyst tends to deteriorate when the catalyst is exposed to high temperature during use. Therefore, when the internal combustion engine is a gasoline engine, the above-described effect is more effectively exhibited.

DESCRIPTION OF EMBODIMENTS

Preferred embodiments of the present invention will be described below with reference to the drawings. Matters other than matters particularly mentioned in the present specification and necessary for the implementation of the present invention (for example, general matters such as arrangement of a particulate filter in a car) can be grasped as design items of a person skilled in the art which are based on the related art in the pertinent field. The present invention can be carried out based on the contents disclosed in this specification and technical common sense in the pertinent field.

Figure 1:
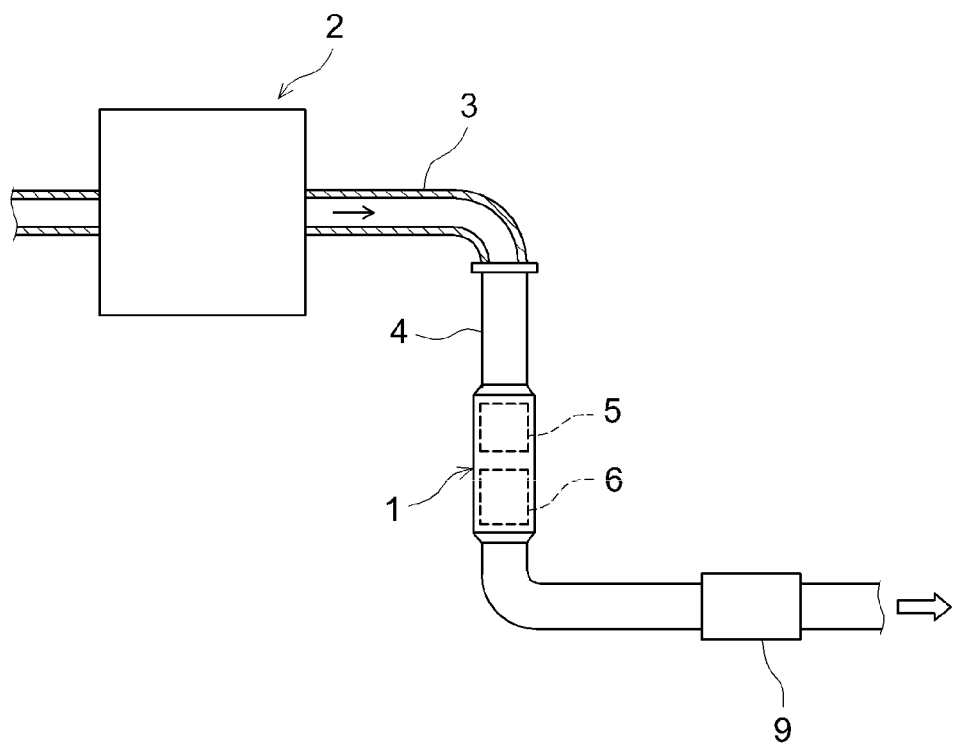
FIG. 1 is a view schematically showing an exhaust passage of an internal combustion engine according to one embodiment.

First, the configuration of an exhaust gas purifying catalyst according to one embodiment of the present invention will be described with reference to FIG. 1. An exhaust gas purifying catalyst 1 disclosed herein is provided in an exhaust system of an internal combustion engine. FIG. 1 is a view schematically showing an internal combustion engine 2 and the exhaust gas purifying catalyst 1 provided in the exhaust system of the internal combustion engine 2.

In the internal combustion engine (engine) according to the present embodiment, an air-fuel mixture including oxygen and fuel gas is supplied. The internal combustion engine burns the air-fuel mixture and converts combustion energy into mechanical energy. At this time, the burned air-fuel mixture becomes exhaust gas and is discharged to the exhaust system. The internal combustion engine 2 having the configuration shown in FIG. 1 is mainly constituted by a gasoline engine of an automobile.

The exhaust system of the engine 2 will be described hereinbelow. An exhaust manifold 3 is connected to an exhaust port (not shown) that communicates the engine 2 with the exhaust system. The exhaust manifold 3 is connected to an exhaust pipe 4 through which exhaust gas flows. An exhaust passage of the present embodiment is formed by the exhaust manifold 3 and the exhaust pipe 4. The arrows in the figure indicate the exhaust gas flow direction.

The exhaust gas purifying catalyst 1 disclosed herein is provided in the exhaust system of the engine 2. The exhaust gas purifying catalyst 1 includes a catalyst unit 5 and a filter unit 6, purifies harmful components (for example, carbon monoxide (CO), hydrocarbon (HC), nitrogen oxides (NOx)) contained in the discharged exhaust gas, and collects particulate matter (PM) contained in the exhaust gas. In this embodiment, the exhaust gas purifying catalyst 1 is disposed directly below the engine 2 and functions as a start-up catalyst (S/C).

The catalyst unit 5 is configured to be capable of purifying ternary components (NOx, HC, CO) contained in the exhaust gas, and is provided in the exhaust pipe 4 communicating with the engine 2. Specifically, as shown in FIG. 1, the catalyst unit is provided on the downstream side of the exhaust pipe 4. The type of the catalyst unit 5 is not particularly limited. The catalyst unit 5 may be, for example, a catalyst in which a noble metal such as platinum (Pt), palladium (Pd), rhodium (Rd) or the like is supported. In this embodiment, a downstream-side catalyst unit 9 is further arranged in the exhaust pipe 4 on the downstream side of the filter unit 6. The downstream-side catalyst unit 9 functions as an underfloor catalyst (UF/C) 9. Since the specific configurations of the downstream-side catalyst unit 9 and the catalyst unit 5 do not characterize the present invention, a detailed description thereof will be herein omitted.

The filter unit 6 is provided on the downstream side of the catalyst unit 5. The filter unit 6 includes a gasoline particulate filter (GPF) capable of collecting and removing particulate matter (hereinafter simply referred to as "PM") contained in the exhaust gas. Hereinafter, the particulate filter according to the present embodiment will be described in detail.

Figure 2:
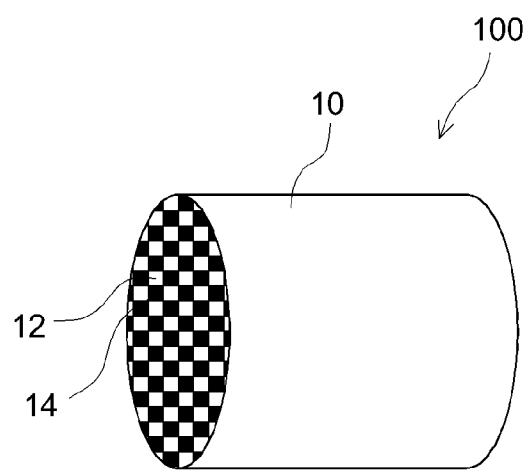
FIG. 2 is a perspective view schematically showing a filter of an exhaust gas purifying catalyst according to one embodiment.
Figure 3:
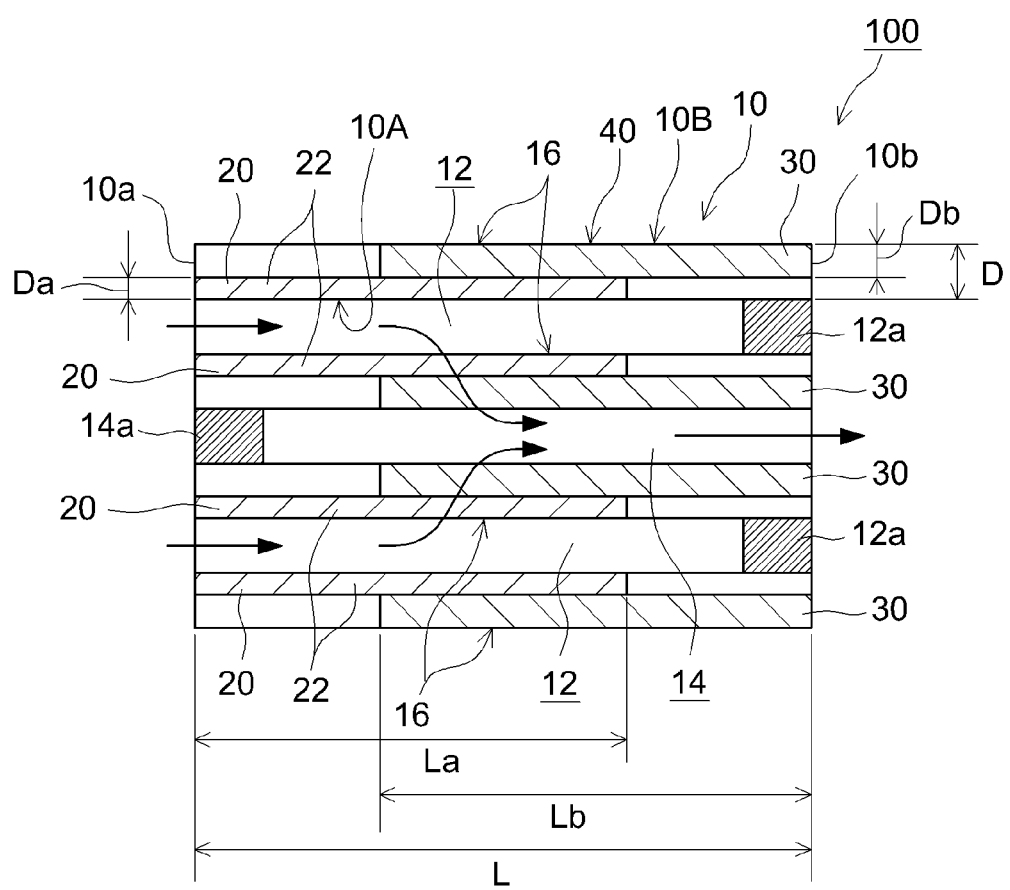
FIG. 3 is a cross-sectional view schematically showing a filter unit of the exhaust gas purifying catalyst according to one embodiment.

FIG. 2 is a perspective view of the particulate filter 100. FIG. 3 is a schematic diagram enlarging a part of a cross section obtained by cutting the particulate filter 100 in the axial direction. As shown in FIGS. 2 and 3, the particulate filter 100 includes a base material 10 having a wall flow structure and a catalyst layer 40.

<Base Material 10>

Various materials and forms conventionally used for this type of application can be used as the base material 10. For example, a base material formed of a ceramic material such as cordierite, silicon carbide (SiC) or the like, or an alloy (stainless steel or the like) can be suitably used. As an example, a base material with a circular tubular outer shape (this embodiment) can be used. However, instead of a circular tubular shape, an elliptical tubular shape or a polygonal tubular shape may be used as the outer shape of the entire base material. Such a base material 10 is composed of inlet cells 12 in which only an end on an exhaust gas inlet side is open, outlet cells 14 which are adjacent to the inlet cells 12 and in which only an end on an exhaust gas outlet side is open, and porous partition walls 16 partitioning the inlet cells 12 and the outlet cells 14. In the present description, the capacity (volume) of the base material 10 means a bulk volume including the volume of inner voids (the inlet cells 12 and the outlet cells 14) in addition to the pure volume of the base material (that is, including the catalyst layer 40 formed in the voids (cells)).

<Inlet Cells 12 and Outlet Cells 14>

In the inlet cell 12, only the end on the exhaust gas inlet side is open, and in the outlet cell 14, which is adjacent to the inlet cell 12, only the end on the exhaust gas outlet side is open. In this embodiment, the end of the inlet cell 12 on the exhaust gas outlet side is plugged with a sealing portion 12a, and the end of the outlet cell 14 on the exhaust gas inlet side is plugged with a sealing portion 14a. The inlet cell 12 and the outlet cell 14 may be set to appropriate shape and size in consideration of the flow rate and components of the exhaust gas to be supplied to the filter 100. For example, the inlet cell 12 and the outlet cell 14 can have various geometric shapes such as rectangular shape such as a square, a parallelogram, a rectangle, a trapezoid and the like, a triangle, other polygons (for example, a hexagon, an octagon), a circle or the like.

<Partition Wall 16>

A partition wall 16 is formed between the adjacent inlet cell 12 and outlet cell 14. The partition wall 16 partitions the inlet cell 12 and the outlet cell 14. The partition wall 16 has a porous structure through which exhaust gas can pass. The porosity of the partition wall 16 is not particularly limited, but it is suitably about 50% to 70%, preferably 55% to 65%. If the porosity of the partition wall 16 is too small, the PM may slip therethrough. Meanwhile, where the porosity of the partition wall 16 is too large, the mechanical strength of the filter 100 tends to decrease, which is not preferable. The thickness of the partition wall 16 is not particularly limited and may be about 150 μm to 400 μm. Within such thickness range of the partition wall, an effect of suppressing an increase in pressure loss can be obtained without impairing the PM trapping efficiency.

<Catalyst Layer 40>

FIG. 3 is a view schematically showing a principal part of the filter cross section in FIG. 2. As shown in FIG. 3, the catalyst layer 40 is provided inside the partition wall 16. More specifically, the catalyst layer 40 is held on the wall surface of the inner pores of the partition wall 16. The catalyst layer 40 has an upstream-side catalyst layer 20 and a downstream-side catalyst layer 30. The upstream-side catalyst layer 20 includes rhodium (Rh) and a Ce-containing oxide including cerium (Ce). Meanwhile, the downstream-side catalyst layer 30 includes palladium (Pd) and a Ce-containing oxide including Ce. The Ce-containing oxide acts to store oxygen in the exhaust gas when the air-fuel ratio of the exhaust gas is lean (that is, an atmosphere on the oxygen excess side), and to release the stored oxygen when the air-fuel ratio of the exhaust gas is rich (that is, an atmosphere on the fuel excess side). As a result, stable catalytic performance can be obtained even when the oxygen concentration in the exhaust gas fluctuates, and the purification performance of the catalyst is improved.

The mass of the catalyst layer 40 per unit volume of the entire base material 10 (that is, the value obtained by dividing the total mass of the upstream-side catalyst layer 20 and the downstream-side catalyst layer 30 by the total volume of the base material 10) is about 105 g/L or more. As a result, the catalyst as a whole can exhibit high OSC performance. In addition, it is possible to obtain the catalyst layer 40 in which performance is hardly deteriorated even when the catalyst is exposed to high temperature during use. From the viewpoints of durability and OSC performance, the mass of the catalyst layer 40 per unit volume of the base material 10 is preferably 110 g/L or more, more preferably 120 g/L or more, and even more preferably 130 g/L or more. In addition, from the viewpoints of low-temperature activity and suppression of peeling of the catalyst layer, it is suitable to set the mass of the catalyst layer 40 per unit volume of the base material 10 to about 210 g/L or less. The mass of the catalyst layer 40 is preferably 200 g/L or less, more preferably 180 g/L or less, even more preferably 160 g/L or less, and particularly preferably 150 g/L or less. From the viewpoints of realizing durability, OSC performance, low-temperature activity and peeling property at a higher level, the catalyst layer 40 having a mass per unit volume of the whole base material 10 of 105 g/L or more and 210 g/L or less is preferable, and the catalyst with the mass of 120 g/L or more and 150 g/L or less is particularly preferable.

The amount of Ce per unit volume of the entire base material 10 (that is, the value obtained by dividing the total mass of Ce contained in the upstream-side catalyst layer 20 and Ce contained in the downstream-side catalyst layer 30 by the total volume of the base material 10) is approximately 14 g/L or more and 35 g/L or less in terms of $CeO_2$. This makes it possible to realize high low-temperature activity and OSC performance in the entire catalyst layer 40. From the viewpoints of low-temperature activity and OSC performance, the amount of Ce per unit volume of the entire base material 10 is preferably 16 g/L or more and 32 g/L or less, and more preferably 20 g/L or more and 30 g/L or less. The technique disclosed herein can be preferably carried out in such a manner that the amount of Ce per unit volume of the entire base material 10 is 24 g/L or more and 28 g/L or less.

In this specification, the amount of Ce per unit volume of the entire base material can be grasped by performing measurement based on, for example, fluorescent X-ray (XRF) analysis. As a specific procedure, the mass of the catalyst layer is calculated from the difference between the mass of the base material coated with the catalyst layer and the mass of the base material before coating with the catalyst layer, the base material coated with the catalyst layer is pulverized, the Ce concentration in the pulverized material is measured using a fluorescent X-ray analyzer, and the mass of Ce (in terms of $CeO_2$) contained in the catalyst layer is obtained from the obtained Ce concentration and the mass of the catalyst layer. Then, by dividing the mass of $CeO_2$ obtained by the total volume of the base material 10, it is possible to grasp the amount of Ce (in terms of $CeO_2$) per unit volume of the entire base material.

<Upstream-Side Catalyst Layer 20>

The upstream-side catalyst layer 20 is disposed in the upstream-side portion 10A in the exhaust gas flow direction including an end portion 10a on the exhaust gas inlet side of the base material 10. In this embodiment, the upstream-side catalyst layer 20 is formed in a portion corresponding to 70% of a length L of the base material 10 (that is, La=0.7 L) from the end portion 10a on the exhaust gas inlet side of the base material 10 toward the downstream side. Further, the upstream-side catalyst layer 20 has an upstream-side independent layer 22 that does not overlap with the downstream-side catalyst layer 30 in the length direction of the base material 10. In this embodiment, the upstream-side independent layer 22 is formed in a portion corresponding to 30% of the length L of the base material 10 from the end portion 10a on the exhaust gas inlet side of the base material 10 toward the exhaust gas outlet side. In addition, the upstream-side catalyst layer 20 is unevenly distributed in the partition wall 16 so as to be in contact with the inlet cell 12 and not in contact with the outlet cell 14 in the thickness direction of the partition wall 16. In this embodiment, the upstream-side catalyst layer 20 is formed in a portion corresponding to 40% of a thickness D of the partition wall 16 (that is, Da=0.4 D) from the surface of the partition wall 16 contacting the inlet cell 12 toward the outlet cell 14 side.

As mentioned hereinabove, the upstream-side catalyst layer 20 includes Rh and a Ce-containing oxide. Examples of the Ce-containing oxide include $CeO_2$ (ceria) and $CeO_2$-containing composite oxides including the ceria. Among these, the use of a ceria-zirconia composite oxide ($CeO_2$—$ZrO_2$ composite oxide) is preferable. When the Ce-containing oxide is a ceria-zirconia composite oxide, the mixing ratio of $CeO_2$ and $ZrO_2$ in the ceria-zirconia composite oxide is $CeO_2$:$ZrO_2$=5:95 to 80:20, preferably 10:90 to 40:60, and more preferably from 15:85 to 30:70. When the mixing ratio of $CeO_2$ is in the above range, high catalytic activity and OSC (oxygen storage/release capacity) can be realized in the upstream-side catalyst layer 20 including Rh.

The amount of Ce per unit volume in the upstream-side portion 10A of the base material 10 (that is, the value obtained by dividing the mass of Ce contained in the upstream-side catalyst layer 20 by the volume of a portion of the base material 10 having the length La and the thickness Da; hereinafter sometimes simply represented by "$CON_{us}$") is 5 g/L or more and 20 g/L or less in terms of $CeO_2$. This makes it possible to exhibit high low-temperature activity and OSC performance in the upstream-side catalyst layer 20 including Rh. From the viewpoints of low-temperature activity and OSC performance, $CON_{us}$ is preferably 6 g/L or more and 18 g/L or less, and more preferably 7 g/L or more and 15 g/L or less. The technique disclosed herein can be preferably carried out in such a manner that the amount of Ce per unit volume in the upstream-side portion 10A is 9 g/L or more and 12 g/L or less. Incidentally, the amount of Ce per unit volume in the upstream-side portion 10A of the base material 10 can be grasped by performing XRF analysis and measuring the mass of the upstream-side portion (portion coated with the upstream-side catalyst layer) of the base material, similarly to the aforementioned amount of Ce per unit volume of the entire base material. That is, the mass of the upstream-side catalyst layer is calculated from the difference between the mass of the upstream-side portion of the base material coated with the upstream-side catalyst layer and the mass of the upstream-side portion of the base material before coating with the upstream-side catalyst layer, the upstream-side portion of the base material coated with the upstream-side catalyst layer is pulverized, the Ce concentration in the pulverized material is measured using a fluorescent X-ray analyzer, and the mass of Ce (in terms of $CeO_2$) contained in the upstream-side catalyst layer is obtained from the obtained Ce concentration and the mass of the upstream-side catalyst layer. Then, by dividing the mass of $CeO_2$ obtained by the volume of the upstream-side portion of the base material, it is possible to grasp the amount of Ce (in terms of $CeO_2$) per unit volume in the upstream-side portion of the base material.

The upstream-side catalyst layer 20 may include an oxide (hereinafter also referred to as a non-Ce-containing oxide) other than the above-described Ce-containing oxide. As such a non-Ce-containing oxide, a metal oxide which is porous and excellent in heat resistance is preferably used. For example, metal oxides such as aluminum oxide (alumina: $Al_2O_3$), zirconium oxide (zirconia: $ZrO_2$), silicon oxide (silica: $SiO_2$), magnesium oxide (magnesia: MgO), titanium oxide (titania: $TiO_2$) or solid solutions thereof can be used. Two or more of these may be used in combination. Among them, the use of $Al_2O_3$ is preferred. $Al_2O_3$ has a larger specific surface area and higher durability (in particular, heat resistance) than Ce-containing oxides. Therefore, thermal stability of the catalyst as a whole is improved. It is preferable that $Al_2O_3$ and the Ce-containing oxide be mixed in a mass mixing ratio ($Al_2O_3$:Ce-containing oxide) within a range of 80:20 to 20:80 (preferably, 45:55 to 30:70). With such a configuration, since the ratio of $Al_2O_3$ and the Ce-containing oxide is in an appropriate balance, the effect of mixing $Al_2O_3$ and the Ce-containing oxide (for example, the effect of enabling a combination of large specific surface area and high durability possessed by $Al_2O_3$ with oxygen storage and release capability possessed by the Ce-containing oxide) can be exhibited more satisfactorily.

Other materials (typically inorganic oxides) may be added as auxiliary components to the upstream-side catalyst layer 20. Examples of substances that can be added to the upstream-side catalyst layer include rare earth elements such as lanthanum (La), neodymium (Nd) and the like, alkaline earth elements such as calcium and the like, and also transition metal elements. Among the above, rare earth elements such as lanthanum, neodymium and the like can be suitably used as a stabilizer because these elements can increase the specific surface area at high temperature without inhibiting the catalytic function. In addition, the amount of these auxiliary components is preferably set to 20 parts by mass or less (preferably 10 parts by mass or less) with respect to 100 parts by mass of the non-Ce-containing oxide.

In the upstream-side catalyst layer 20 disclosed herein, rhodium (Rh) as a noble metal is supported on a carrier composed of at least one (for example, both) of the above-described Ce-containing oxide and non-Ce-containing oxide. By including Rh in the upstream-side catalyst layer 20, harmful substances in the exhaust gas can be purified satisfactorily. In addition, since Rh has higher durability (in particular, heat resistance) than Pd, disposing Rh in the upstream-side catalyst layer 20 improves thermal stability of the catalyst as a whole. The supported amount of Rh is not particularly limited, but is preferably in the range of 0.1 parts by mass to 10 parts by mass (for example, 0.1 parts by mass to 3 parts by mass, preferably 0.1 parts by mass to 1 part by mass, for example, 0.3 parts by mass to 1 part by mass) with respect to 100 parts by mass of the carrier contained in the upstream-side catalyst layer 20. Where the supported amount of Rh is less than this, sufficient catalytic activity cannot be obtained, and where the supported amount of Rh is more than this, the effect is saturated and becomes disadvantageous in terms of cost. There is no particular limitation on the method for supporting Rh on the carrier (Ce-containing oxide and/or non-Ce-containing oxide) of the upstream-side catalyst layer 20. For example, the supported rhodium can be prepared by impregnating a carrier powder with an aqueous solution including a rhodium salt (for example, nitrate) or a rhodium complex (for example, tetraammine complex), drying, and calcining.

The upstream-side catalyst layer 20 disclosed herein may include another noble metal catalyst to the extent that the performance of Rh is not impaired. For example, platinum (Pt), ruthenium (Ru), iridium (Ir), osmium (Os), or the like can be used as a noble metal catalyst other than Rh.

A suitable molding amount of the upstream-side catalyst layer 20 is such that the mass of the upstream-side catalyst layer 20 per unit volume in the upstream-side portion 10A of the base material 10 (that is, the value obtained by dividing the total mass of the upstream-side catalyst layer 20 by the volume of the portion of the base material 10 having the length La and the thickness Da; hereinafter sometimes simply referred to as "$M_{us}$") is approximately 50 g/L or more. This makes it possible to obtain the upstream-side catalyst layer 20 in which performance is hardly deteriorated even when the catalyst is exposed to high temperature during use. From the viewpoint of durability and the like, the mass $M_{us}$ of the upstream-side catalyst layer 20 is preferably 60 g/L or more, and more preferably 70 g/L or more. The upper limit of the mass $M_{us}$ of the upstream-side catalyst layer 20 is not particularly limited, but it is suitable to set the upper limit to about 100 g/L or less. By doing so, the purification performance of the catalyst can be exhibited at a lower temperature. From the viewpoint of low-temperature activity, $M_{us}$ is preferably 95 g/L or less, more preferably 90 g/L or less, and even more preferably 85 g/L or less. From the viewpoint of achieving both durability and low-temperature activity, the upstream-side catalyst layer 20 having the $M_{us}$ of 50 g/L or more and 100 g/L or less is preferable, and the upstream-side catalyst layer having the $M_{us}$ of 65 g/L or more and 90 g/L or less is particularly preferable. For example, the upstream-side catalyst layer 20 having the $M_{us}$ of 75 g/L or more and 85 g/L or less may be used.

<Downstream-Side Catalyst Layer 30>

The downstream-side catalyst layer 30 is disposed in the downstream-side portion 10B in the exhaust gas flow direction including an end portion 10b on the exhaust gas outlet side of the base material 10. In this embodiment, the downstream-side catalyst layer 30 is formed in a portion corresponding to 70% of the length L of the base material 10 (that is, Lb=0.7 L) from the end portion 10b on the exhaust gas outlet side of the base material 10 toward the upstream side. In addition, the downstream-side catalyst layer 30 is unevenly distributed in the partition wall 16 so as to be in contact with the outlet cell 14 and not in contact with the inlet cell 12 in the thickness direction of the partition wall 16. In this embodiment, the downstream-side catalyst layer 30 is formed so as not to overlap with the upstream-side catalyst layer 20 in the thickness direction of the partition wall 16. Specifically, the downstream-side catalyst layer 30 is formed in a portion corresponding to 60% of the thickness D of the partition wall 16 (that is, Db=0.6D) from the surface of the partition wall 16 contacting the outlet cell 14 toward the inlet cell 12 side.

The downstream-side catalyst layer 30 includes a Ce-containing oxide including cerium (Ce). As the Ce-containing oxide, the same as the Ce-containing oxide described for the upstream-side catalyst layer 20 can be used. Among these, the use of a ceria-zirconia composite oxide ($CeO_2$—$ZrO_2$ composite oxide) is preferable. When the Ce-containing oxide is a ceria-zirconia composite oxide, the mixing ratio of $CeO_2$ and $ZrO_2$ in the ceria-zirconia composite oxide is $CeO_2:ZrO_2$=5:95 to 80:20, preferably 30:70 to 70:30, and more preferably from 40:60 to 60:40. When the mixing ratio of $CeO_2$ is within the above range, high catalytic activity and OSC (oxygen storage/release capacity) can be realized in the downstream-side catalyst layer 30 including Pd.

The amount of Ce per unit volume in the downstream-side portion 10B of the base material 10 (that is, the value obtained by dividing the mass of Ce contained in the downstream-side catalyst layer 30 by the volume of a portion of the base material 10 having the length Lb and the thickness Db; hereinafter sometimes simply represented by "$CON_{ds}$") is 15 g/L or more and 35 g/L or less. This makes it possible to exhibit high low-temperature activity and OSC performance in the downstream-side catalyst layer 30 including Pd. From the viewpoints of low-temperature activity and OSC performance, $CON_{ds}$ is preferably 18 g/L or more and 32 g/L or less, and more preferably 20 g/L or more and 30 g/L or less. The technique disclosed herein can be preferably carried out in such a manner that the amount of Ce per unit volume in the downstream-side portion 10B is 22 g/L or more and 28 g/L or less. Incidentally, the amount of Ce per unit volume in the lower portion 10B of the base material 10 can be grasped by performing XRF analysis and measuring the mass of the downstream-side portion (portion coated with the downstream-side catalyst layer) of the base material, similarly to the aforementioned amount of Ce per unit volume of the entire base material. That is, the mass of the downstream-side catalyst layer is calculated from the difference between the mass of the downstream-side portion of the base material coated with the downstream-side catalyst layer and the mass of the downstream-side portion of the base material before coating with the downstream-side catalyst layer, the downstream-side portion of the base material coated with the downstream-side catalyst layer is pulverized, the Ce concentration in the pulverized material is measured using a fluorescent X-ray analyzer, and the mass of Ce (in terms of $CeO_2$) contained in the downstream-side catalyst layer is obtained from the obtained Ce concentration and the mass of the downstream-side catalyst layer. Then, by dividing the mass of $CeO_2$ obtained by the volume of the downstream-side portion of the base material, it is possible to grasp the amount of Ce (in terms of $CeO_2$) per unit volume in the downstream-side portion of the base material.

From the viewpoint of more satisfactorily demonstrating the effect of including the Ce-containing oxide into both the downstream-side catalyst layer 30 and the upstream-side catalyst layer 20, a ratio ($CON_{ds}/CON_{us}$) of the amount $CON_{ds}$ of Ce per unit volume in the downstream-side portion 10B to the amount $CON_{us}$ of Ce per unit volume in the upstream-side portion 10A is suitably about 0.75 or more, preferably 1 or more, and more preferably 1.5 or more. The upper limit of the ratio ($CON_{ds}/CON_{us}$) is not particularly limited, but is suitably about 7 or less, preferably 5 or less, and more preferably 3 or less (for example, 2 or less). By including Ce-containing oxides in both the downstream-side catalyst layer 30 and the upstream-side catalyst layer 20 so as to achieve such a mass ratio, the OSC performance and low-temperature activity can be effectively enhanced.

The downstream-side catalyst layer 30 may include an oxide (hereinafter also referred to as a non-Ce-containing oxide) other than the above-described Ce-containing oxide. As such a non-Ce-containing oxide, the same non-Ce-containing oxide described with respect to the upstream-side catalyst layer 20 can be used. Among them, the use of $Al_2O_3$ is preferred. It is preferable that $Al_2O_3$ and the Ce-containing oxide be mixed in a mass mixing ratio ($Al_2O_3$:Ce-containing oxide) within a range of 80:20 to 20:80 (preferably 45:55 to 30:70). With such a configuration, since the ratio of $Al_2O_3$ and the Ce-containing oxide is in an appropriate balance, the effect of mixing $Al_2O_3$ and the Ce-containing oxide (for example, the effect of enabling a combination of large specific surface area and high durability possessed by $Al_2O_3$ with oxygen storage and release capability possessed by the Ce-containing oxide) can be exhibited more satisfactorily.

Other materials (typically, inorganic oxides) may be added as auxiliary components to the downstream-side catalyst layer 30. Examples of substances that can be added to the downstream-side catalyst layer include rare earth elements such as lanthanum (La), yttrium (Y) and the like, alkaline earth elements such as calcium and the like, and also transition metal elements. Among the above, rare earth elements such as lanthanum yttrium and the like can be suitably used as a stabilizer because these elements can increase the specific surface area at high temperature without inhibiting the catalytic function. In addition, the amount of these auxiliary components is preferably set to 20 parts by mass or less (preferably 10 parts by mass or less) with respect to 100 parts by mass of the non-Ce-containing oxide.

In the downstream-side catalyst layer 30 disclosed herein, palladium (Pd) as a noble metal is supported on a carrier composed of at least one (for example, both) of the above-described Ce-containing oxide and non-Ce-containing oxide. By including Pd in the downstream-side catalyst layer 30, harmful substances in the exhaust gas can be purified satisfactorily. The supported amount of Pd is not particularly limited, but is suitably in the range of 0.1 parts by mass to 10 parts by mass (for example, 0.5 parts by mass to 5 parts by mass, preferably 1 part by mass to 3 parts by mass) with respect to 100 parts by mass of the carrier contained in the downstream-side catalyst layer 30. Where the supported amount of Pd is less than this, sufficient catalytic activity cannot be obtained, and where the supported amount of Pd is more than this, the effect is saturated which is disadvantageous in terms of cost. There is no particular limitation on the method for supporting Pd on the carrier (Ce-containing oxide and/or non-Ce-containing oxide) of the downstream-side catalyst layer 30. For example, the supported palladium can be prepared by impregnating a carrier powder with an aqueous solution including a palladium salt (for example, nitrate) or a palladium complex (for example, tetraammine complex), drying, and calcining.

The downstream-side catalyst layer 30 disclosed herein may include another noble metal catalyst to the extent that the performance of Pd is not impaired. For example, ruthenium (Ru), iridium (Ir), osmium (Os), or the like can be used as a noble metal catalyst other than Pd.

As the molding amount of the downstream-side catalyst layer 30, the mass of the downstream-side catalyst layer 30 per unit volume in the downstream-side portion 10B of the base material 10 (that is, the value obtained by dividing the total mass of the downstream-side catalyst layer 30 by the volume of the portion of the base material 10 having the length Lb and the thickness Db; hereinafter sometimes simply referred to as "$M_{ds}$") is approximately 100 g/L or more. This makes it possible to exhibit high OSC performance for the catalyst as a whole. From the viewpoint of OSC performance, the $M_{ds}$ is preferably 110 g/L or more, and more preferably 115 g/L or more. The upper limit of the mass $M_{ds}$ of the downstream-side catalyst layer 30 is not particularly limited, but from the viewpoint of suppressing peeling of the downstream-side catalyst layer 30, $M_{ds}$ is suitably about 150 g/L or less, preferably 145 g/L or less, more preferably 140 g/L or less, and even more preferably 135 g/L or less. From the viewpoint of achieving both the OSC performance and peeling property, the downstream-side catalyst layer 30 having the $M_{ds}$ of 100 g/L or more and 150 g/L or less is preferable, and the downstream-side catalyst layer having the $M_{ds}$ of 110 g/L or more and 130 g/L or less is particularly preferable. For example, the downstream-side catalyst layer 30 having the $M_{ds}$ of 115 g/L or more and 125 g/L or less may be used.

In a preferred embodiment, the ratio ($M_{ds}/M_{us}$) of the mass $M_{ds}$ of the downstream-side catalyst layer 30 per unit volume in the downstream-side portion 10B to the mass $M_{us}$ of the upstream-side catalyst layer 20 per unit volume in the upstream-side portion 10A of the base material 10 is approximately 1 or more. The ratio ($M_{ds}/M_{us}$) is preferably 1.1 or more, more preferably 1.2 or more, and even more preferably 1.4 or more. The upper limit of the ratio ($M_{ds}/M_{us}$) is not particularly limited, but is suitably about 5 or less, preferably 4 or less, and more preferably 3 or less. By molding the downstream-side catalyst layer 30 and the upstream-side catalyst layer 20 so as to achieve such a mass ratio, the light-off performance can be more effectively enhanced.

<Method for Forming Catalyst Layer>

The catalyst layer 40 may be formed by using different slurries for the upstream-side catalyst layer 20 and the downstream-side catalyst layer 30. For example, an upstream-side catalyst layer forming slurry for forming the upstream-side catalyst layer 20 and a downstream-side catalyst layer forming slurry for forming the downstream-side catalyst layer 30 are prepared. The upstream-side catalyst layer forming slurry includes Rh and a Ce-containing oxide and, if necessary, other upstream-side catalyst layer constituent components. The downstream-side catalyst layer forming slurry includes Pd and a Ce-containing oxide and, if necessary, other downstream-side catalyst layer constituent components. The upstream-side catalyst layer forming slurry is applied to one end of the base material (a portion to be the end portion on the exhaust gas inlet side), and the slurry is sucked in from the other end of the base material so that the slurry is coated on a portion corresponding to 70% of the length of the base material from the one end toward the other end (the portion to be the end portion on the exhaust gas outlet side of the base material) and also so that the slurry is coated on the region from the surface of the partition wall to 40% of the thickness of the partition wall.

Further, the downstream-side catalyst layer forming slurry is applied to the other end (the portion to be the end portion on the exhaust gas outlet side) of the base material, and the slurry is sucked in from the one end so that the slurry is coated on a portion corresponding to 70% of the length of the base material from the other end toward the one end (the portion to be the end portion on the exhaust gas inlet side of the base material) and also so that the slurry is coated on the region from the surface of the partition wall to 60% of the thickness of the partition wall. By such suction, the slurry can be efficiently caused to flow into the pores of the partition wall. After the slurry has flown into the pores of the partition wall 16, the slurry is dried and calcined at a predetermined temperature. As a result, the catalyst layer 40 is held on the wall surfaces of the pores of the partition wall 16. As described above, it is possible to obtain a filter catalyst in which the catalyst layer 40 is formed on the wall surfaces of the pores of the partition wall 16.

In the process of forming the catalyst layer 40 by coating, a binder may be included in the slurry to ensure suitable adhesion of the slurry to the inside of the partition wall 16. As the binder, for example, alumina sol, silica sol or the like is preferably used. The viscosity of the slurry may be appropriately adjusted so that the slurry could easily flow into the partition wall 16 of the base material 10. In addition, the inflow amount of the slurry may be appropriately adjusted according to the volume of the base material 10 and the coating amount of the upstream-side catalyst layer 20 so that the inflowing slurry appropriately remains in the partition wall 16 of the base material 10. The average particle diameter of the particles in the slurry (typically, a carrier powder supporting a noble metal) is not particularly limited, but it can be approximately 0.001 μm to 10 μm (preferably 0.01 μm to 5 μm). Within such a range of the average particle diameter of the particles in the slurry, the slurry can be efficiently caused to flow into the inner pores of the partition wall 16. Therefore, the catalyst layer 40 can be formed more stably. The average particle diameter (median value: D50 diameter) of the particles in the slurry can be grasped based on a laser diffraction/scattering method.

In this particulate filter 100, as shown in FIG. 3, exhaust gas flows from the inlet cell 12 of the base material 10. The exhaust gas flowing in from the inlet cell 12 passes through the porous partition wall 16 and reaches the outlet cell 14. In FIG. 3, the route where the exhaust gas flowing in from the inlet cell 12 passes through the partition wall 16 and reaches the outlet cell 14 is indicated by an arrow. At this time, since the partition wall 16 has a porous structure, PM is trapped in the pores on the surface of the partition wall 16 and the pores inside the partition wall 16 while the exhaust gas passes through the partition wall 16. In addition, since the upstream-side catalyst layer 20 and the downstream-side catalyst layer 30 are provided inside the partition wall 16, harmful components in the exhaust gas are purified while the exhaust gas passes through the inside and the surface of the partition wall 16. The exhaust gas that has passed through the partition wall 16 and reached the outlet cell 14 is discharged from the opening on the exhaust gas outlet side to the outside of the filter 100.

With such a particulate filter 100, the mass of the catalyst layer 40 per unit volume of the entire base material 10 is from 105 g/L to 210 g/L, the mass of the upstream-side catalyst layer 20 per unit volume in the upstream-side portion 10A of the base material 10 is from 50 g/L to 100 g/L, the mass of the downstream-side catalyst layer 30 per unit volume in the downstream-side portion 10B of the base material 10 is from 100 g/L to 150 g/L, the amount of Ce per unit volume of the entire base material 10 is from 14 g/L to 35 g/L in terms of $CeO_2$, and the amount of Ce per unit volume in the upstream-side portion 10A of the base material 10 is from 5 g/L to 20 g/L in terms of $CeO_2$. Therefore, deterioration of the catalyst is suppressed even when the catalyst is exposed to high temperature, and satisfactory HC purification performance can be exhibited in a low-temperature state immediately after the start of the engine. Further, since both the upstream-side catalyst layer 20 and the downstream-side catalyst layer 30 are disposed inside the partition wall 16 (the wall surface of the internal pores), the contact with the exhaust gas is improved as compared with the case in which the catalyst layers 20, 30 are formed on the surface (outside) of the partition wall 16. As a result, harmful components in the exhaust gas can be purified more efficiently. Therefore, with the present configuration, it is possible to provide an optimum filter catalyst (exhaust gas purifying catalyst) that has a catalyst purification efficiency higher than that in the related art and excels in light-off performance, such that HC purification performance is exhibited at a lower temperature. Such a filter catalyst, as described above, is not particularly prone to deterioration in performance even when exposed to high temperature and excels in light-off performance. Therefore, such filter catalyst is particularly useful as a start-up catalyst disposed directly under the engine.

In the present description, "the catalyst layer is disposed inside the partition wall" means that the catalyst layer is mainly present inside the partition wall, rather than on the outside (typically, the surface) of the partition wall. More specifically, for example, the cross section of the partition wall of the upstream-side catalyst layer is observed with an electron microscope and the total coating amount in the range with a length (0.1 L) which is 1/10 of the length L of the base material from the end on the exhaust gas inlet side to the downstream side is taken as 100%. In this case, the coating amount fraction present inside the partition wall is typically 80% or more, for example, 85% or more, preferably 90% or more, further 99% or more, and particularly substantially 100%. Therefore, this can be clearly distinguished, for example, from a case where a part of the catalyst layer unintentionally penetrates into the partition wall when the catalyst layer is arranged on the surface of the partition wall.

In the above embodiment, the upstream-side catalyst layer 20 is formed in a portion corresponding to 70% of the length L of the base material 10 from the end portion 10a on the exhaust gas inlet side of the base material 10 toward the downstream side (that is, La=0.7 L), and the downstream-side catalyst layer 30 is formed in a portion corresponding to 70% of the length L of the base material 10 from the end portion 10b on the exhaust gas outlet side of the base material 10 toward the upstream side (that is, Lb=0.7 L), but such features are not limiting. For example, the upstream-side catalyst layer 20 may be formed in a portion corresponding to at least 40% and at most 80% of the length L of the base material 10 from the end portion 10a on the exhaust gas inlet side of the base material 10 toward the downstream side (that is, La=0.4 L to 0.8 L). Further, the downstream-side catalyst layer 30 may be formed in a portion corresponding to at least 40% and at most 80% of the length L of the base material 10 from the end portion 10b on the exhaust gas outlet side of the base material 10 toward the exhaust gas inlet side (that is, Lb=0.4 L to 0.8 L). When the lengths of the upstream-side catalyst layer 20 and the downstream-side catalyst layer 30 are within such ranges, the effect of improving the light-off performance can be exhibited more advantageously.

In the above embodiment, the upstream-side catalyst layer 20 has the upstream-side independent layer 22 which does not overlap with the downstream-side catalyst layer 30 in the longitudinal direction of the base material 10 in the portion corresponding to 30% of the length L of the base material 10 from the end portion 10a on the exhaust gas inlet side of the base material 10 toward the exhaust gas outlet side. This length of the upstream-side independent layer 22 is not limiting. For example, the upstream-side independent layer 22 may be formed in a portion corresponding to at least 20% and at most 50% of the length L of the base material 10 from the end portion 10a on the exhaust gas inlet side of the base material 10 toward the exhaust gas outlet side. Such an upstream-side independent layer 22 can contribute effectively to improvement of light-off performance.

Further, in the above embodiment, the upstream-side catalyst layer 20 is formed in a portion corresponding to 40% of the thickness D of the partition wall 16 from the surface of the partition wall 16 contacting the inlet cell 12 to the outlet cell 14 side (that is, Da=0.4 D), and the downstream-side catalyst layer 30 is formed in a portion corresponding to 60% of the thickness D of the partition wall 16 from the surface of the partition wall 16 contacting the outlet cell 14 to the inlet cell 12 side (that is, Db=0.6 D), but these features are not limiting. For example, the upstream-side catalyst layer 20 may be formed in the entire region in the thickness direction of the partition wall 16 so as to be in contact with the inlet cell 12 and to be in contact with the outlet cell 14. Further, the upstream-side catalyst layer 20 may be formed in a portion corresponding to at least 20% and at most 80% of the thickness D of the partition wall 16 from the surface of the partition wall 16 contacting the inlet cell 12 to the outlet cell 14 side (that is, Da=0.2 D to 0.8 D). Further, the downstream-side catalyst layer 30 may be formed in the entire region in the thickness direction of the partition wall 16 so as to be in contact with the outlet cell 14 and to be in contact with the inlet cell 12. Further, the downstream-side catalyst layer 30 may be formed in a portion corresponding to at least 40% and at most 100% (for example, 80%) of the thickness D of the partition wall 16 from the surface of the partition wall 16 contacting the outlet cell 14 to the inlet cell 12 side (that is, Da=0.4 D to 1 D, for example, 0.4 D to 0.8 D). Within the ranges of the thicknesses of the upstream-side catalyst layer 20 and the downstream-side catalyst layer 30, the effect of improving the light-off performance can be exhibited more advantageously.

Hereinafter, test examples relating to the present invention will be described, but the present invention is not intended to be limited to the following test examples.

<Test Example 1>

An exhaust gas purifying catalyst was prepared in which Rh and a Ce-containing oxide were disposed in an upstream-side catalyst layer and Pd and a Ce-containing oxide were disposed in a downstream-side catalyst layer. Specifically, alumina was prepared as a carrier for forming the upstream-side catalyst layer and impregnated with a Rh nitrite solution as a noble metal catalyst solution, followed by evaporation and drying to prepare a Rh/alumina carrier powder which supported 0.3% by mass of Rh. Slurry A was prepared by mixing this Rh/alumina carrier powder, a ceria-zirconia composite oxide as a Ce-containing oxide and ion exchanged water. Subsequently, by using this slurry A, suction coating was implemented on a portion corresponding to a predetermined range of the length L of a cordierite base material (wall flow type base material shown in FIG. 3: diameter 103 mm, total length 100 mm) from the end on the exhaust gas inlet side of the base material toward the downstream side and on a portion corresponding to 40% of the thickness of the partition wall 16 from the surface of the partition wall 16 in contact with the inlet cell 12 toward the outlet cell 14 side, followed by drying and calcining to form the upstream-side catalyst layer 20 inside the partition wall 16.

Next, a carrier for forming a downstream-side catalyst layer and a ceria-zirconia composite oxide as a Ce-containing oxide were prepared and impregnated with a Pd nitrate solution as a noble metal catalyst solution, followed by evaporation and drying to prepare a Pd/ceria-zirconia composite oxide carrier powder which supported 3% by mass of Pd. Slurry B was prepared by mixing the Pd/ceria-zirconia composite oxide carrier powder, alumina, and ion exchanged water. By using this slurry B, suction coating was implemented on a portion corresponding to a predetermined range of the length L of the base material from the end on the exhaust gas outlet side of the base material toward the upstream side and on a portion corresponding to 60% of the thickness of the partition wall 16 from the surface of the partition wall 16 in contact with the outlet cell 14 toward the inlet cell 12 side, followed by drying and calcining to form the downstream-side catalyst layer 30 inside the partition wall 16. As described above, exhaust gas purifying catalysts according to Examples 1 to 21 including the upstream-side catalyst layer 20 and the downstream-side catalyst layer 30 were obtained.

Examples 1 to 21 differed from each other by the mass of the catalyst layer per unit volume of the entire base material (hereinafter referred to as "total coating amount"), the mass of the upstream-side catalyst layer per unit volume in the upstream-side portion of the base material (hereinafter referred to as "Fr coating amount-zone"), the mass of the downstream-side catalyst layer per unit volume in the downstream-side portion of the base material (hereinafter referred to as "Rr coating amount-zone"), the amount of $CeO_2$ per unit volume of the entire base material (hereinafter referred to as "total $CeO_2$ amount"), the amount of $CeO_2$ per unit volume in the upstream-side portion of the base material (hereinafter referred to as "Fr$CeO_2$ amount-zone"), the amount of $CeO_2$ per unit volume in the downstream-side portion of the base material (hereinafter referred to as "Rr$CeO_2$ amount-zone"), the length of the upstream-side catalyst layer (hereinafter referred to as "Fr coating width") and the length of the downstream-side catalyst layer (hereinafter referred to as "Rr coating width") when the total length of the base material is taken as 100%, and the length of the upstream-side independent layer (hereinafter referred to as "width of Fr independent layer"). The total coating amount, Fr coating amount-zone, Rr coating amount-zone, total $CeO_2$ amount, Fr$CeO_2$ amount-zone, Rr$CeO_2$ amount-zone, Fr coating width, Rr coating width, and width of Fr independent layer are summarized in Table 1 for the exhaust gas purifying catalyst according to each example.

TABLE 1

|  | Total coating amount (g/L) | Fr coating amount-zone (g/L) | Rr coating amount-zone (g/L) | Total CeO$_2$ amount (g/L) | FrCeO$_2$ amount-zone (g/L) | RrCeO$_2$ amount-zone (g/L) | Fr coating width (%) | Rr coating width (%) | Width of Fr independent layer (%) | Light-off HC T50 (° C.) |
|---|---|---|---|---|---|---|---|---|---|---|
| Example 1 | 140 | 80 | 120 | 25 | 10 | 25 | 70 | 70 | 30 | 280 |
| Example 2 | 70 | 50 | 50 | 13 | 6 | 13 | 70 | 70 | 30 | 350 |
| Example 3 | 105 | 75 | 75 | 20 | 9 | 19 | 70 | 70 | 30 | 290 |
| Example 4 | 210 | 150 | 150 | 39 | 19 | 38 | 70 | 70 | 30 | 288 |
| Example 5 | 238 | 170 | 170 | 45 | 21 | 43 | 70 | 70 | 30 | 345 |
| Example 6 | 140 | 30 | 170 | 32 | 4 | 43 | 70 | 70 | 30 | 341 |
| Example 7 | 140 | 125 | 75 | 24 | 16 | 19 | 70 | 70 | 30 | 330 |
| Example 8 | 140 | 80 | 120 | 22 | 10 | 25 | 40 | 70 | 30 | 290 |
| Example 9 | 140 | 80 | 120 | 21 | 10 | 25 | 30 | 70 | 30 | 304 |
| Example 10 | 140 | 80 | 120 | 26 | 10 | 25 | 80 | 70 | 30 | 291 |
| Example 11 | 140 | 80 | 120 | 27 | 10 | 25 | 90 | 70 | 30 | 305 |
| Example 12 | 140 | 80 | 120 | 17 | 10 | 25 | 70 | 40 | 60 | 298 |
| Example 13 | 140 | 80 | 120 | 15 | 10 | 25 | 70 | 30 | 70 | 307 |
| Example 14 | 140 | 80 | 120 | 27 | 10 | 25 | 70 | 80 | 20 | 294 |
| Example 15 | 140 | 80 | 120 | 30 | 10 | 25 | 70 | 90 | 10 | 306 |
| Example 16 | 140 | 80 | 120 | 22 | 10 | 25 | 20 | 80 | 20 | 290 |
| Example 17 | 140 | 80 | 120 | 21 | 10 | 25 | 60 | 60 | 50 | 291 |
| Example 18 | 140 | 80 | 120 | 16 | 10 | 25 | 60 | 40 | 60 | 296 |
| Example 19 | 56 | 40 | 40 | 11 | 5 | 10 | 70 | 70 | 30 | 350 |
| Example 20 | 70 | 50 | 50 | 13 | 6 | 13 | 70 | 70 | 30 | 355 |
| Example 21 | 70 | 50 | 50 | 13 | 6 | 13 | 70 | 70 | 30 | 360 |

<Durability Test>

The exhaust gas purifying catalyst according to each example was set in a catalytic converter which was mounted on the upstream side of the exhaust system of a gasoline engine. Then, a durability test was conducted in which the catalyst was exposed to exhaust gas at a catalyst inlet temperature of 950° C. for 100 h. A level was set at which the exhaust gas was discharged at the time of engine operation in a mode in which the stoichiometric state (A/F=14.6) and fuel cut were cyclically repeated.

<Evaluation of Purification Performance>

After the above durability test, the exhaust gas purifying catalyst according to each example was attached to the exhaust pipe of a gasoline engine at an engine bench, the catalyst inlet gas temperature was raised from 150° C. at 50° C./min every minute, a purification rate of the HC gas during temperature rise (light-off) was measured, and a 50% purification temperature (T50) was measured. Here, the 50% purification temperature is the catalyst inlet gas temperature when the purification rate of the HC gas contained in the exhaust gas has reached 50%. Such testing can be an indicator of the light-off performance of the catalyst. That is, it can be said that the HC purification performance of the catalyst is exhibited at a lower temperature and the light off performance becomes better at a lower 50% purification temperature. The results are shown in the "Light-off HC T50" column of Table 1.

As shown in Table 1, in catalysts of Examples 1, 3, and 8-18 in which the total coating amount was from 105 g/L to 210 g/L, the Fr coating amount-zone was from 50 g/L to 100 g/L, the Rr coating amount-zone was from 100 g/L to 150 g/L, the total CeO$_2$ amount was from 14 g/L to 35 g/L, and the FrCeO$_2$ amount-zone was from 5 g/L to 20 g/L, the 50% purification temperature was lower than 310° C. and the HC light-off performance was good. In addition, from the comparison of Examples 1 and 8 to 11, it is clear that an extremely low 50% purification temperature of 300° C. or less was achieved in particular by setting the Fr coating width to 40% to 80% (Examples 1, 8, and 10). From the comparison of Examples 1 and 12 to 15, it is clear that an extremely low 50% purification temperature of 300° C. or less was achieved in particular by setting the Rr coating width to 40% to 80% (Examples 1, 12, and 14). Further, from the comparison of Examples 1 and 16 to 18, it is clear that an extremely low 50% purification temperature of 295° C. or less was achieved in particular by setting the width of the Fr independent layer to 20% to 50% (Examples 1, 16, and 17). This result has confirmed that an optimum exhaust gas purifying catalyst with a further improved HC light-off performance can be realized by setting the mass of the catalyst layer per unit volume of the entire base material from 105 g/L to 210 g/L, the mass of the upstream-side catalyst layer per unit volume in the upstream-side portion of the base material from 50 g/L to 100 g/L, the mass of the downstream-side catalyst layer per unit volume in the downstream-side portion of the base material from 100 g/L to 150 g/L, the amount of Ce per unit volume of the entire base material from 14 g/L to 35 g/L in terms of CeO$_2$, and the amount of Ce per unit volume in the upstream-side portion of the base material to 5 g/L to 20 g/L in terms of CeO$_2$.

Although various modified examples of the exhaust gas purifying catalyst 1 have been exemplified above, the structure of the exhaust gas purifying catalyst 1 is not limited to any of the above-described embodiments.

Further, the shape and structure of each member and part of the exhaust gas purifying catalyst 1 may be changed. In the example shown in FIG. 1, the catalyst unit is provided on the upstream side of the filter unit, but the catalyst unit may be omitted. The exhaust gas purifying catalyst 1 is particularly suitable as a device for purifying harmful components in an exhaust gas having a relatively high exhaust temperature, such as in a gasoline engine. However, the exhaust gas purifying catalyst 1 according to the present invention is not limited to use for purifying harmful components in the exhaust gas of a gasoline engine, and can be used for various applications for purifying harmful components in exhaust gas discharged from other engines (for example, a diesel engine).

INDUSTRIAL APPLICABILITY

According to the present invention, it is possible to provide an exhaust gas purifying catalyst capable of improving exhaust gas purification performance.

The invention claimed is:

1. An exhaust gas purifying catalyst that is disposed in an exhaust passage of an internal combustion engine and purifies exhaust gas discharged from the internal combustion engine, the exhaust gas purifying catalyst comprising:
a base material having a wall-flow structure comprising an inlet cell in which only an end on an exhaust gas inlet side is open, an outlet cell which is adjacent to the inlet cell and in which only an end on an exhaust gas outlet side is open, and a porous partition wall partitioning the inlet cell and the outlet cell, and
a catalyst layer provided inside the partition wall, wherein the catalyst layer has
an upstream-side catalyst layer disposed in an upstream-side portion in an exhaust gas flow direction comprising the end on the exhaust gas inlet side of the base material, and
a downstream-side catalyst layer disposed in a downstream-side portion in the exhaust gas flow direction comprising the end on the exhaust gas outlet side of the base material,
the upstream-side catalyst layer comprises Rh and a Ce-containing oxide,
the downstream-side catalyst layer comprises Pd and a Ce-containing oxide,
a mass of the catalyst layer per unit volume of the entire base material is from 105 g/L to 210 g/L,
a mass of the upstream-side catalyst layer per unit volume in the upstream-side portion of the base material is from 50 g/L to 100 g/L,
a mass of the downstream-side catalyst layer per unit volume in the downstream-side portion of the base material is from 100 g/L to 150 g/L,
an amount of Ce per unit volume of the entire base material is from 14 g/L to 35 g/L in terms of $CeO_2$, and
an amount of Ce per unit volume in the upstream-side portion of the base material is from 5 g/L to 20 g/L in terms of $CeO_2$.

2. The exhaust gas purifying catalyst according to claim 1, wherein
the upstream-side catalyst layer is formed in a portion corresponding to at least 40% and at most 80% of a length of the base material from the end on the exhaust gas inlet side of the base material toward the exhaust gas outlet side, and
the downstream-side catalyst layer is formed in a portion corresponding to at least 40% and at most 80% of a length of the base material from the end on the exhaust gas outlet side of the base material toward the exhaust gas inlet side.

3. The exhaust gas purifying catalyst according to claim 2, wherein
the upstream-side catalyst layer has an upstream-side independent layer that does not overlap with the downstream-side catalyst layer in a length direction of the base material, and
the upstream-side independent layer is formed in a portion corresponding to at least 20% and at most 50% of the length of the base material from the end on the exhaust gas inlet side of the base material toward the exhaust gas outlet side.

4. The exhaust gas purifying catalyst according to claim 3, wherein
the upstream-side catalyst layer is formed in a portion corresponding to at least 20% and at most 80% of a thickness of the partition wall from a surface of the partition wall in contact with the inlet cell toward the outlet cell side, and
the downstream-side catalyst layer is formed in a portion corresponding to at least 40% and at most 100% of the thickness of the partition wall from a surface of the partition wall in contact with the outlet cell toward the inlet cell side.

5. The exhaust gas purifying catalyst according to claim 2, wherein
the upstream-side catalyst layer is formed in a portion corresponding to at least 20% and at most 80% of a thickness of the partition wall from a surface of the partition wall in contact with the inlet cell toward the outlet cell side, and
the downstream-side catalyst layer is formed in a portion corresponding to at least 40% and at most 100% of the thickness of the partition wall from a surface of the partition wall in contact with the outlet cell toward the inlet cell side.

6. The exhaust gas purifying catalyst according to claim 1, wherein
the upstream-side catalyst layer has an upstream-side independent layer that does not overlap with the downstream-side catalyst layer in a length direction of the base material, and
the upstream-side independent layer is formed in a portion corresponding to at least 20% and at most 50% of the length of the base material from the end on the exhaust gas inlet side of the base material toward the exhaust gas outlet side.

7. The exhaust gas purifying catalyst according to claim 6, wherein
the upstream-side catalyst layer is formed in a portion corresponding to at least 20% and at most 80% of a thickness of the partition wall from a surface of the partition wall in contact with the inlet cell toward the outlet cell side, and
the downstream-side catalyst layer is formed in a portion corresponding to at least 40% and at most 100% of the thickness of the partition wall from a surface of the partition wall in contact with the outlet cell toward the inlet cell side.

8. The exhaust gas purifying catalyst according to claim 1, wherein
the upstream-side catalyst layer is formed in a portion corresponding to at least 20% and at most 80% of a thickness of the partition wall from a surface of the partition wall in contact with the inlet cell toward the outlet cell side, and
the downstream-side catalyst layer is formed in a portion corresponding to at least 40% and at most 100% of the thickness of the partition wall from a surface of the partition wall in contact with the outlet cell toward the inlet cell side.

9. The exhaust gas purifying catalyst according to claim 1, wherein
in a thickness direction of the partition wall,
the upstream-side catalyst layer is unevenly distributed in the partition wall so as to be in contact with the inlet cell and not in contact with the outlet cell, and
downstream-side catalyst layer is unevenly distributed in the partition wall so as to be in contact with the outlet cell and not in contact with the inlet cell.

10. The exhaust gas purifying catalyst according to claim 9, wherein
the upstream-side catalyst layer is formed so as not to overlap with the downstream-side catalyst layer in the thickness direction of the partition wall.

11. The exhaust gas purifying catalyst according to claim 1, wherein
the Ce-containing oxide is a ceria-zirconia composite oxide.

12. The exhaust gas purifying catalyst according to claim 1, wherein
the internal combustion engine is a gasoline engine.

* * * * *